United States Patent
Puri et al.

(10) Patent No.: US 8,439,683 B2
(45) Date of Patent: May 14, 2013

(54) FOOD RECOGNITION USING VISUAL ANALYSIS AND SPEECH RECOGNITION

(75) Inventors: Manika Puri, Fremont, CA (US); Zhiwei Zhu, Plainsboro, NJ (US); Jeffrey Lubin, Princeton, NJ (US); Tom Pschar, Ringoes, NJ (US); Ajay Divakaran, Monmouth Junction, NJ (US); Harpreet S. Sawhney, West Windsor, NJ (US)

(73) Assignee: SRI International, Menlo Park, CA (US)

( * ) Notice: Subject to any disclaimer, the term of this patent is extended or adjusted under 35 U.S.C. 154(b) by 544 days.

(21) Appl. No.: 12/683,124

(22) Filed: Jan. 6, 2010

(65) Prior Publication Data
US 2010/0173269 A1    Jul. 8, 2010

Related U.S. Application Data

(60) Provisional application No. 61/143,081, filed on Jan. 7, 2009.

(51) Int. Cl.
*G09B 19/00*    (2006.01)

(52) U.S. Cl.
USPC ........................................................ 434/127

(58) Field of Classification Search .... 434/127; 382/110
See application file for complete search history.

(56) References Cited

U.S. PATENT DOCUMENTS 6,508,762 B2 * 1/2003 Karnieli .................... 600/300
6,745,214 B2 * 6/2004 Inoue et al. ................. 708/133

OTHER PUBLICATIONS

Thanarat Chalidabhongse et al. "2D/3D Vision-Based Mango's Feature Extraction and Sorting" 2006.*
F. Zhu et al., "Technology-assisted dietary assessment," SPIE, 2008.
N. Dalal et al.,"Human detection using oriented histograms of flow and appearance," ECCV, 2008, pp. 428-441.
M. Varna and D. Ray, "Learning the discriminative power invariance tradeoff," ICCV, 2007.
W. Cai, Q. Yu, H. Wang, and J. Zheng "A fast contour-based approach to circle and ellipse detection," in: 5th IEEE World Congress on Intelligent Control and Automation (WCICA) 2004.
M. Varma and A. Zisserman, "Classify images of materials: Achieving viewpoint and illumination independence," in ECCV, pp. 255-271, 2002.
M. Varma and A. Zisserman, "Texture classification: Are filter banks necessary?" in CVPR, pp. 691-698, 2003.

(Continued)

*Primary Examiner* — Xuan Thai
*Assistant Examiner* — Evan Page
(74) *Attorney, Agent, or Firm* — Moser Taboada

(57) ABSTRACT

A method and system for analyzing at least one food item on a food plate is disclosed. A plurality of images of the food plate is received by an image capturing device. A description of the at least one food item on the food plate is received by a recognition device. The description is at least one of a voice description and a text description. At least one processor extracts a list of food items from the description; classifies and segments the at least one food item from the list using color and texture features derived from the plurality of images; and estimates the volume of the classified and segmented at least one food item. The processor is also configured to estimate the caloric content of the at least one food item.

32 Claims, 11 Drawing Sheets

OTHER PUBLICATIONS

D. Lowe, "Distinctive image features from scale-invariant keypoints," IJCV, pp. 91-110, 2004.

K. Mikolajczyk and C. Schmid, "A performance evaluation of local descriptors," PAMI, pp. 1615-1630, 2005.

R. E. Schapire, Y. Freund, P. Bartlett, and W. S. Lee, "Boosting the margin: A new explanation for the effectiveness of voting methods," The Annals of Statistics, pp. 1651-1686, 1998.

C. Harris and M. Stephens, "A combined corner and edge detector," in the 4th Alvey Vision Conference, 1988.

D. Nister, O. Naroditsky, and J. Bergen, "Visual odometry," in CVPR, 2004.

R. Hartley and A. Zisserman, "Multiple View Geometry in Computer Vision," Cambridge University Press, 2000, pp. 120-122.

* cited by examiner

ALL PAIRS OF FOODS
(SORTED ACCORDING TO CLASSIFICATION ACCURACY)

NUMBER OF CANDIDATES

FIG. 12

| IMAGE | CLASSIFICATION | 3D SURFACE |
|---|---|---|
| | SET 1 | |
| | SET 2 | |
| | SET 3 | |
| | SET 4 | |
| | SET 5 | |
| | SET 6 | |

FOOD RECOGNITION USING VISUAL ANALYSIS AND SPEECH RECOGNITION

CROSS-REFERENCE TO RELATED APPLICATIONS

This application claims the benefit of U.S. provisional patent application No. 61/143,081 filed Jan. 7, 2009, the disclosure of which is incorporated herein by reference in its entirety.

GOVERNMENT RIGHTS IN THIS INVENTION

This invention was made with U.S. government support under contract number NIH 1U01HL091738-01. The U.S. government has certain rights in this invention.

FIELD OF THE INVENTION

The invention relates generally to vision systems. More specifically, the invention relates to a system and method for automatically identifying items of food on a plate and computing the volume of each food item to aid in making a determination of the caloric content of the food on the plate.

BACKGROUND OF THE INVENTION

Studies have shown that a healthy diet can significantly reduce the risk of disease. This may provide a motivation, either self-initiated or from a doctor, to monitor and assess dietary intake in a systematic way. It is known that individuals do a poor job of assessing their true dietary intake. In the kitchen when preparing a meal, one can estimate the total caloric content of a meal by looking at food labels and calculating portion size, given a recipe of amounts of ingredients. At a restaurant, estimating caloric content of a meal is more difficult. A few restaurants may list in their menus the calorie value of certain low fat/dietary conscience meals, but the majority of meals are much higher in calories, so they are not listed. Even dieticians need to perform complex lab measurements to accurately assess caloric content of foods.

Human beings are good at identifying food, such as the individual ingredients of a meal, but are known to be poor at volume estimation, and it is nearly impossible even of one had the total volume of a meal to estimate the volume of individual ingredients, which may be mixed and either seen or unseen. It is difficult for an individual to measure nutritional consumption by individuals in an easy yet quantitative manner. Several software applications, such as CalorieKing™, CaloricCounter™, etc., are of limited value since they perform a simple calculation based on portion size which cannot be accurately estimated by users. Veggie Vision™ claims to automatically recognize fruits and vegetables in a supermarket environment during food checkout. However, there are few, if any, published technical details about how this is achieved.

Automatic image analysis techniques of the prior art are more successful at volume computation than at food item identification. Automated and accurate food recognition is particularly challenging because there are a large number of food types that people consume. A single category of food may have large variations. Moreover, diverse lighting conditions may greatly alter the appearance of food to a camera which is configured to a capture food appearance data. In F. Zhu et al., "Technology-assisted dietary assessment," SPIE, 2008, ("hereinafter "Zhu et al."), Zhu et al. uses an intensity-based segmentation and classification of each food item using color and texture features. Unfortunately, the system of Zhu et al. does not estimate the volume of food needed for accurate assessment of caloric content. State of the art object recognition methods, such as the methods described in M. Everingham et al., "The PASCAL Visual Object Classes Challenge 2008 (VOC2008)," are unable to operate on a large number of food classes.

Recent success in recognition is largely due to the use of powerful image features and their combinations. Concatenated feature vectors are commonly used as input for classifiers. Unfortunately, this is feasible only when the features are homogeneous, e.g., as in the concatenation of two histograms (HOG and IMH) in N. Dalal et al., "Human detection using oriented histograms of flow and appearance," ECCV, 2008. Linear combinations of multiple non-linear kernels, each of which is based on one feature type, is a more general way to integrate heterogeneous features, as in M. Varna and D. Ray, "Learning the discriminative power invariance tradeoff," ICCV, 2007. However, both the vector concatenation and the kernel combination based methods require computation of all of the features.

Accordingly, what would be desirable, but has not yet been provided, is a system and method for effective and automatic food recognition for large numbers of food types and variations under diverse lighting conditions.

SUMMARY OF THE INVENTION

The above-described problems are addressed and a technical solution achieved in the art by providing a method and system for analyzing at least one food item on a food plate, the method being executed by at least one processor, comprising the steps of receiving a plurality of images of the food plate; receiving a description of the at least one food item on the food plate; extracting a list of food items from the description; classifying and segmenting the at least one food item from the list using color and texture features derived from the plurality of images; and estimating the volume of the classified and segmented at least one food item. The system and method may be further configured for estimating the caloric content of the at least one food item. The description may be at least one of a voice description and a text description. The system and method may be further configured for profiling at least one of the user and meal to include at least one food item not input during the step of receiving a description of the at least one food item on the food plate.

Classifying and segmenting the at least one food item may further comprise: applying an offline feature-based learning method of different food types to train a plurality of classifiers to recognize individual food items; and applying an online feature-based segmentation and classification method using at least a subset of the food type recognition classifiers trained during offline feature-based learning. Applying an offline feature-based learning method may further comprise: selecting at least three images of the plurality of images, the at least three images capturing the same scene; color normalizing one of the three images; employing an annotation tool is used to identify each food type; and processing the color normalized image to extract color and texture features. Applying an online feature-based segmentation and classification method may further comprise: selecting at least three images of the plurality of images, the at least three images capturing the same scene; color normalizing one of the three images; locating the food plate using a contour based circle detection method; and processing the color normalized image to extract color and texture features. Color normalizing may comprise detecting a color pattern in the scene.

According to an embodiment of the invention, processing the at least three images to extract color and texture features may further comprise: transforming color features to a CIE L*A*B color space; determining 2D texture features by applying a histogram of orientation gradient (HOG) method; and placing the color features and 2D texture features into bins of histograms in a higher dimensional space. The method may further comprise: representing at least one food type by a cluster of color and texture features in a high-dimensional space using an incremental K-means clustering method; representing at least one food type by texton histograms; and classifying the one food type using an ensemble of boosted SVM classifiers. Applying an online feature-based segmentation and classification method may further comprise: applying a k-nearest neighbors (k-NN) classification method to the extracted color and texture features to each pixel of the color normalized image and assigning at least one label to each pixel; applying a dynamic assembled multi-class classifier to an extracted color and texture feature for each patch of the color normalized image and assigning one label to each patch; and applying an image segmentation technique to obtain a final segmentation of the plate into its constituent food labels.

According to a preferred embodiment of the invention, the processing the at least three images to extract color and texture features may further comprise: extracting color and texture features using Texton histograms; training a set of one-versus-one classifiers between each pair of foods; and combining color and texture information from the Texton histograms using an Adaboost-based feature selection classifier. Applying an online feature-based segmentation and classification method may further comprise: applying a multi-class classifier to every patch of the three input images to generate a segmentation map; and dynamically assembling a multi-class classifier from a subset of the offline trained pair-wise classifiers to assign a small set of labels to each pixel of the three images.

Features may be selected for applying a multi-class classifier to every patch of the three input images by employing a bootstrap procedure to sample training data and select features simultaneously. The bootstrap procedure may comprise: randomly sampling a set of training data and computing all features in feature pool; training individual SVM classifiers; applying a 2-fold validation process to evaluate the expected normalized margin for each feature to update the strong classifier; applying a current strong classifier to densely sampled patches in the annotated images, wherein wrongly classified patches are added as new samples, and weights of all training samples are updated; and stopping the training if the number of wrongly classified patches in the training images falls below a predetermined threshold.

According to an embodiment of the present invention, estimating volume of the classified and segmented at least one food item may further comprise: capturing a set of three 2D images taken at different positions above the food plate with a calibrated image capturing device using an object of known size for 3D scale determination; extracting and matching multiple feature points in each image frame estimating relative camera poses among the three 2D images using the matched feature points; selecting two images from the three 2D images to form a stereo pair and from dense sets of points, determining correspondences between two views of a scene of the two images; performing a 3D reconstruction on the correspondences to generate 3D point clouds of the at least one food item; and estimating the 3D scale and table plane from the reconstructed 3D point cloud to compute the 3D volume of the at least one food item.

BRIEF DESCRIPTION OF THE DRAWINGS

The present invention may be more readily understood from the detailed description of an exemplary embodiment presented below considered in conjunction with the attached drawings and in which like reference numerals refer to similar elements and in which:

FIG. 12 shows qualitative results of classification and 3D volume estimation obtained during testing of the system of FIG. 2.

It is to be understood that the attached drawings are for purposes of illustrating the concepts of the invention and may not be to scale.

DETAILED DESCRIPTION OF THE INVENTION

Figure 1:
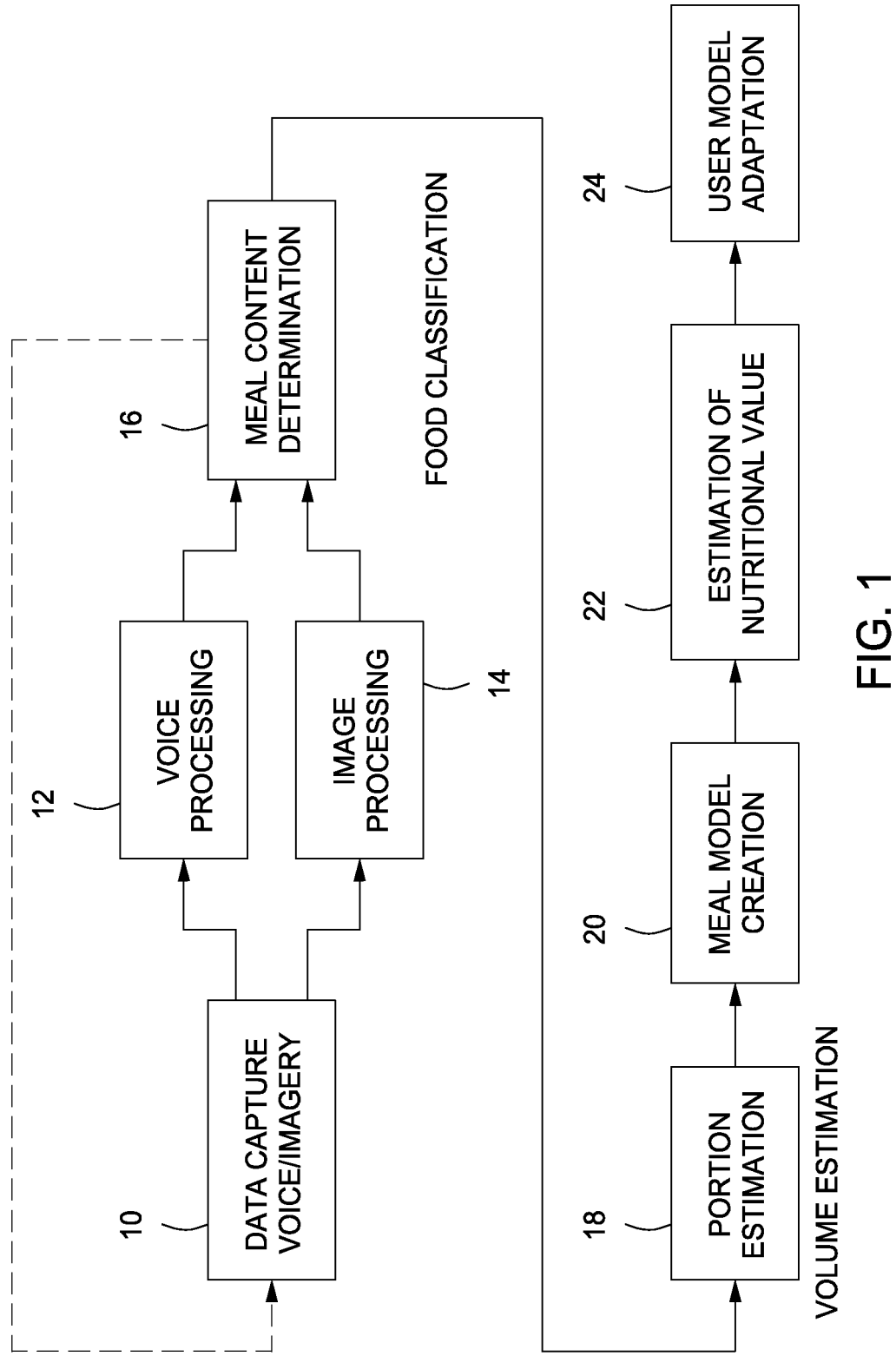
FIG. 1 is a process flow diagram illustrating exemplary modules/steps for food recognition, according to an embodiment of the present invention.
Figure 2:
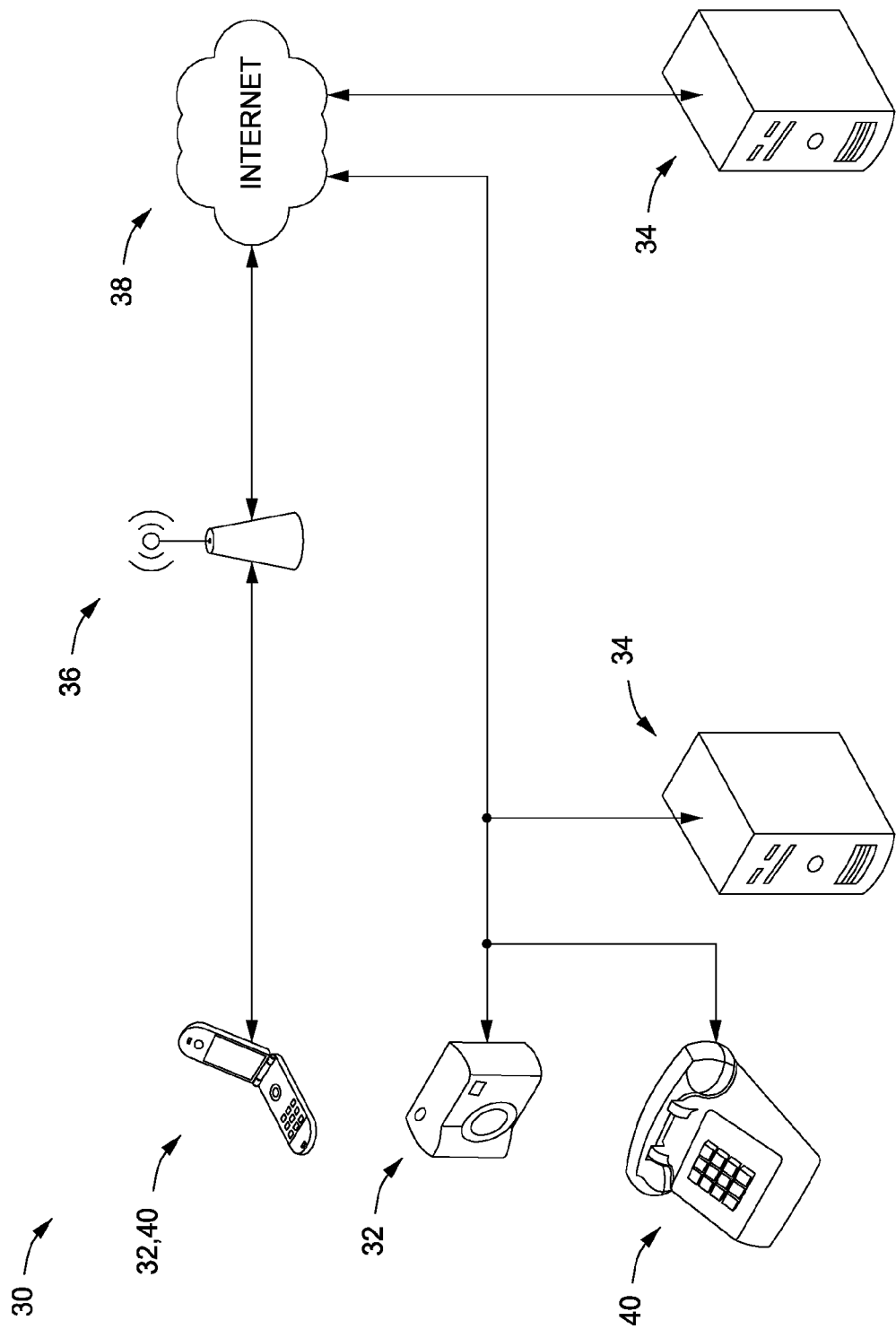
FIG. 2 is an exemplary hardware architecture of a food recognition system 30, according to an embodiment of the present invention.

FIG. 1 is a process flow diagram illustrating exemplary modules/steps for food recognition, according to an embodiment of the present invention. FIG. 2 is an exemplary hardware architecture of a food recognition system 30, according to an embodiment of the present invention. Referring now to FIGS. 1 and 2, in data capturing module 10, visual and audio and/or text data are captured pertaining to a plate of food. According to a preferred embodiment of the present invention, a plurality of images of a food plate, preferably at least three images, are taken by an image capturing device 32. The image capturing device 32 may be, for example, a cell phone or smart phone equipped with a camera, a laptop or desktop computer or workstation equipped with a webcam, or any camera operating in conjunction with a computing platform. In a preferred embodiment, the images are either directly transferred to an image and voice processing server/computer 34 comprising at least one processor directly connected to the image capturing device 32 via, for example, a USB cable, or remotely to the image and voice processing server/computer 34 over a cell network 36 and/or the Internet 38. In data capturing module 10, according to an embodiment of the present invention, data describing the types of items of food on the food plate may be captured by a description recognition device 40 for receive a description of items on the food plate from the user in a processing step 12. According to an embodiment of the present invention, the description recognition device may be, but is not limited to, a voice recognition device, such as a cell phone or voice phone. Alternatively, the description recognition device 40 may be provided with a menu of items that may be present in a meal from which the user chooses, or the user may input food items by inputting text which is recognized by a text recognition device. The image capturing device 32 and the description recognition device 40 may be integrated in a single device, e.g., a cell phone or smart phone. The image and voice processing server/computer 34 and/or the description recognition device 40 may be equipped with automatic speech recognition software.

Figure 3:
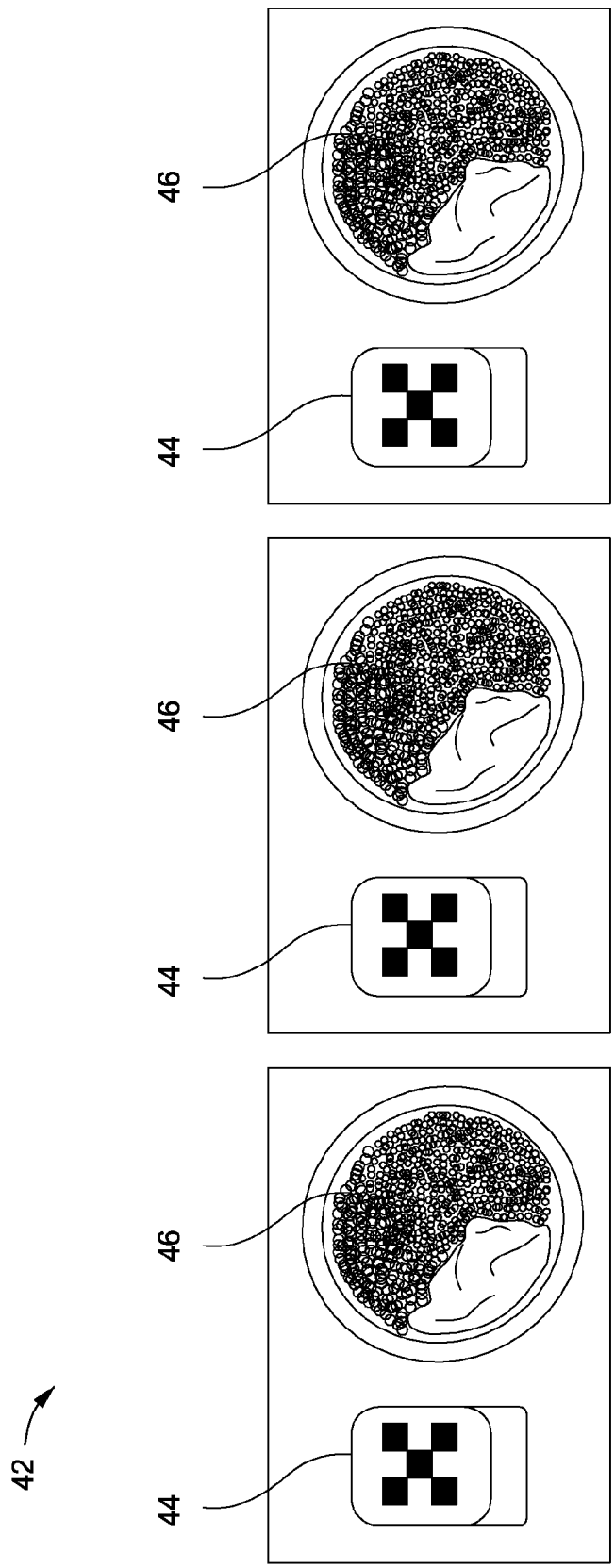
FIG. 3 shows three images taken by the image capturing device of FIG. 2 from three different positions.

FIG. 3 shows three images 42 taken by the image capturing device 32 of FIG. 2 from three different positions. The images 42 may be subject to parallax and substantially different lighting conditions. The system 30 of FIG. 2 needs to have some guidance with respect to the size of items on a food plate. To this effect, a credit card sized object 44 may be included in the images 42 for calibration of 3D size in image processing module 12. The credit card sized object may be an actual credit card or, for example, an object exhibiting a pattern of black and white squares of known size. The pattern or items located on the object 44 may be used to establish the relationship between size in image pixels and the actual size of food items 46 on the food plate say, for example, in centimeters. This provides a calibration of pixels per centimeter in the images 42.

According to an embodiment of the present invention, the automatic speech recognition software in the voice processing module 14 extracts the list of food from the speech input. Note that the location of the food items on the plate is not specified by the user. Referring again to FIG. 1, food items identified in the voice processing module 14 are classified in a meal content determination module 16, which makes use of the list of food items provided by the voice/image processing modules 12, 14 to first identify the types of food items on the plate.

One element of food identification includes plate finding. The list of foods items provided by automatic speech recognition in the voice processing module 14 is used to initialize food classification in the meal content determination module 16. According to an embodiment of the present invention, the food items on the food plate are classified and segmented using color and texture features. Classification and segmentation of food items in the meal content determination module 16 is achieved using one or more classifiers known in the art to be described hereinbelow. In portion estimation module 18, the volume of each of the classified and segmented food items is estimated.

In an optional meal model creation module 20, the individual segmented food items are reconstructed on a model of the food plate.

In Estimation of Nutritional Value module 22, the caloric content of the food items of the entire meal may be estimated based on food item types present on the food plate and volume of the food item. In addition to calorie count, other nutritional information may be provided such as, for example, the amount of certain nutrients such as sodium, the amount of carbohydrates versus fat versus protein, etc.

In an optional User Model Adaption module 24, a user and/or the meal is profiled for potential missing items on the food plate. A user may not identify all of the items on the food plate. Module 24 provides a means of filling in missing items after training the system 30 with the food eating habits of a user. For example, a user may always include mashed potatoes in their meal. As a result, the system 30 may include probing questions which ask the user at a user interface (not shown) whether the meal also includes items, such as mashed potatoes, that were not originally input in the voice/text recognition module 40 by the user. As another variation, the User Model Adaption module 24 may statistically assume that certain items not input are, in fact, present in the meal. The User Model Adaption module 24 may be portion specific, location specific, or even time specific (e.g., a user may be unlikely to dine on a large portion of steak in the morning).

According to an embodiment of the preset invention, plate finding comprises applying the Hough Transform to detect the circular contour of the plate. Finding the plate helps restrict the food classification to the area within the plate. A 3-D depth computation based method may be employed in which the plate is detected using the elevation of the surface of the plate.

An off-the-shelf speech recognition system may be employed to recognize the list of foods spoken by the end-user into the cell-phone. In one embodiment, speech recognition comprises matching the utterance with a pre-determined list of foods. The system 30 recognizes words as well as combinations of words. As the system 30 is scaled up, speech recognition may be made more flexible by accommodating variations in the food names spoken by the user. If the speech recognition algorithm runs on a remote server, more than sufficient computational resources are available for full-scale speech recognition. Furthermore, since the scope of the speech recognition is limited to names of foods, even with a full-size food name vocabulary, the overall difficulty of the speech recognition task is much less than that of the classic large vocabulary continuous speech recognition problem.

Figure 4A:
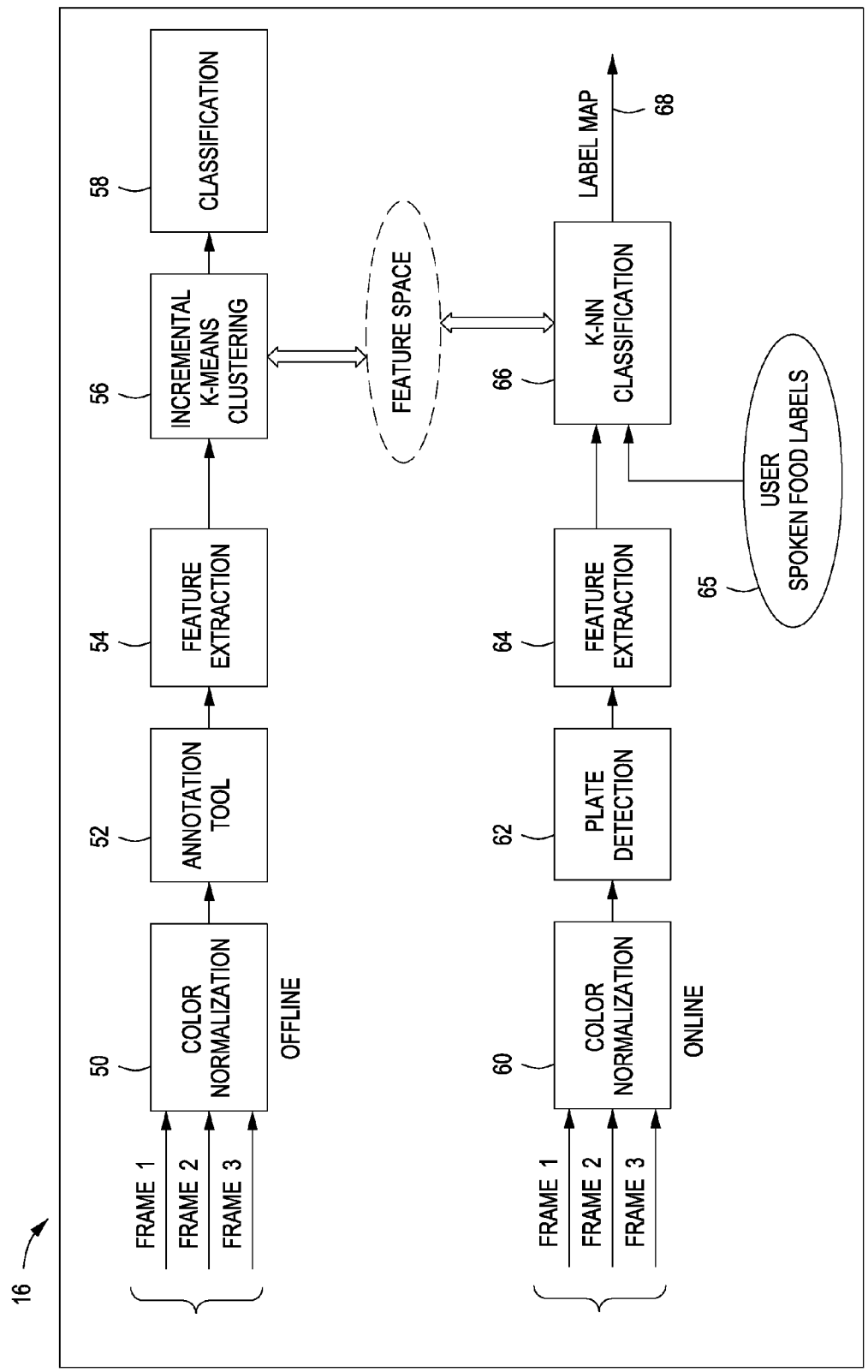
FIG. 4A is a process flow diagram illustrating exemplary steps for classifying and segmenting food items using color and texture features employed by the meal content determination module of FIG. 1, according to an embodiment of the present invention.

FIG. 4A is a process flow diagram illustrating exemplary steps for classifying and segmenting food items using color and texture features employed by the meal content determination module 16 of FIG. 1. Food classification and segmentation is achieved using offline feature-based learning of different food types which ultimately trains a plurality of classifiers to recognize individual food items and online feature-based segmentation and classification using at least a subset of the food type recognition classifiers trained during offline feature-based learning. In offline step 50 and again in online step 60, at least three frames of a plurality of frames are color normalized, the at least three images capturing the same scene. Color differences due to various lighting conditions and picture taking angles occurring in the three frames are synchronized to a single set of colors for each of the frames. To deal with varying lighting conditions, a color pattern is placed in the image for photometric calibration. Fourteen colors (12 from the color pattern and 2 from the checkerboard) have been used to solve a 3×3 color transformation matrix using a least squares solution. As texture features may vary with changes in scale, normalization of scale is necessary. For this purpose, a scaling factor is determined to map the checker-board to a predetermined size (75×75 pixel). A color pattern is detected in the scene and one of the three images is color normalized. At offline step 52, an annotation tool is used to identify each food type. Annotations may be provided by the user to establish ground truth. At online step 62, the plate is located by using a contour based circle detection method proposed in W. Cai, Q. Yu, H. Wang, and J. Zheng "A fast contour-based approach to circle and ellipse detection," in: 5*th IEEE World Congress on Intelligent Control and Automation* (*WCICA*) 2004. The plate is regarded as one label during classification and plate regions are annotated as well in the training set. At both offline steps 54 and online steps 64, the color normalized image is processed to extract color and texture features. Typically the features comprise color features and 2D texture features placed into bins of histograms in a higher dimensional space. The color features are transformed to a CIE L*A*B* color space, wherein the size of the vector of the resulting histogram is:

Size of feature vector=32 dimensional histogram per channel×3 channels($L,A,B$)=96 dimensions The 2D Texture Features are determined from both extracting HOG features over 3 scales and 4 rotations wherein:

Size of feature vector=12 orientation bins×2×2(grid size)=48 dimensions

And from steerable filters over 3 scales and 6 rotations wherein:
Mean and variance of filter response energies is determined over all rotations per scale
The Size of feature vector=3 scales×2 (mean, variance)×16 bin histogram=96 dimensions
Histograms of filter outputs are extracted over scale and orientations.

Variations of these features in terms of number of scales and orientations are also incorporated. A key innovation is the use of absolute scale in defining the scale of features by means of a calibration. Since calibration produces an absolute pixels/cm scale, scales are typically chosen in cms for representing the texture of various foods. For instance, scales of 0.5, 1, 2, 4 cms may be used to capture the texture scale of most common foods. Furthermore, an aggregation scale is defined as a multiple of these texture scales. The cms scales are converted to pixels using the calibration. According to an embodiment of the present invention, at off line step 56, each food type is represented by a cluster of color and texture features in a high-dimensional space using an incremental K-means clustering method. In offline step 58, at least one food type is represented by Texton histograms to be described hereinbelow. Food class identification may be performed using an ensemble of boosted SVM classifiers. However, for online classification step 66, since there may be a large number of food classes to be classified, a k-NN (k-nearest neighbors) classification method is used. The number of clusters chosen for each food type is performed adaptively so that an over-complete set of cluster centers is obtained. During online classification, each pixel's color and texture features are computed and assigned a set of plausible labels using the speech/text input 65 as well as color/texture k-NN classification. A dynamically assembled multi-class classifier may be applied to an extracted color and texture feature for each patch of the color normalized image and one label may be assigned to each patch. The result 68 is an assignment of a small set of labels to each pixel.

Subsequently, an image segmentation technique, such as a Belief Propagation (BP) like technique, may be applied to achieve a final segmentation of the plate into its constituent food labels. For BP, data terms comprising of confidence in the respective color and/or texture feature may be employed. Also, smoothness terms for label continuity may be employed.

Figure 4B:
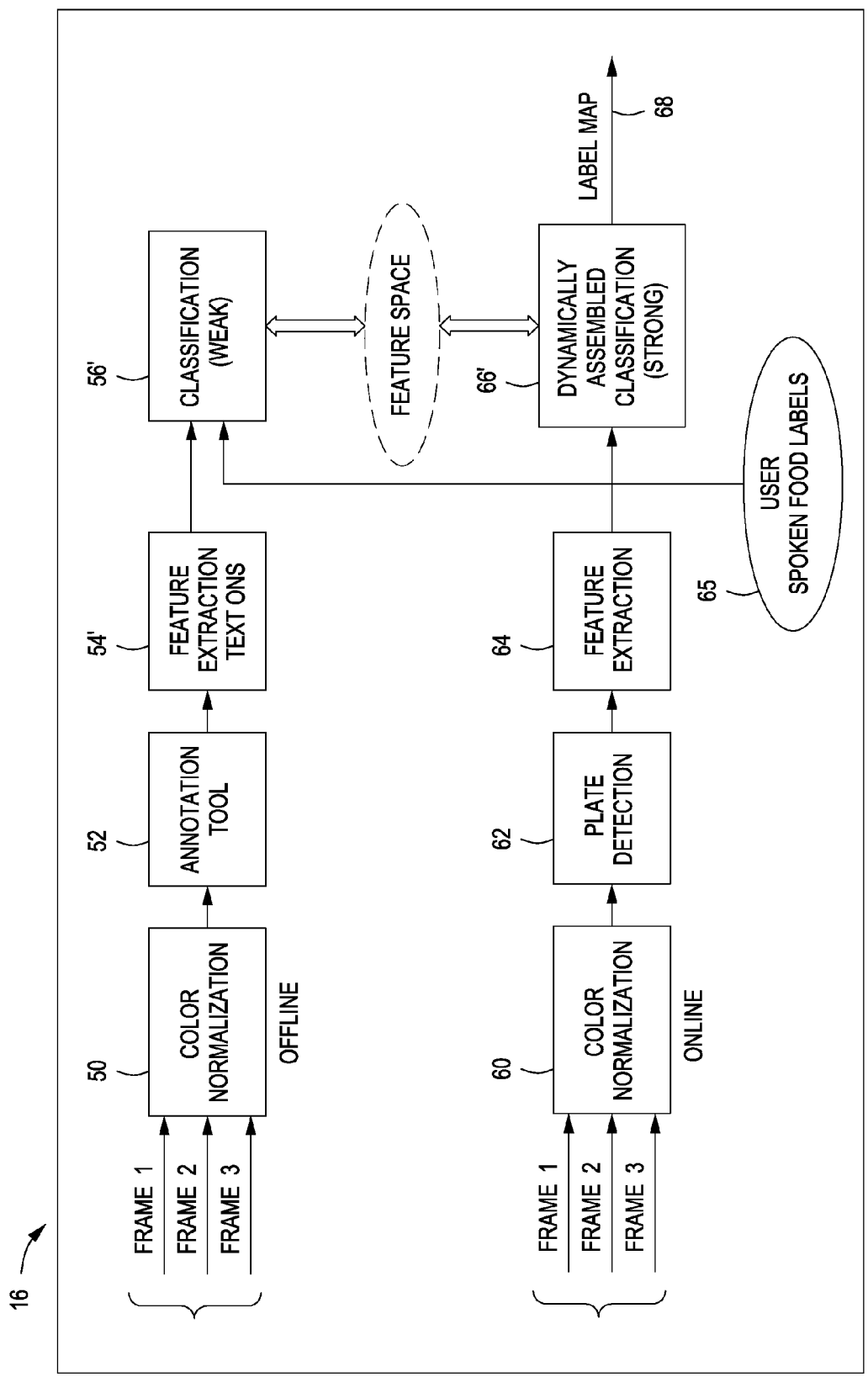
FIG. 4B is a process flow diagram illustrating exemplary steps for classifying and segmenting food items using color and texture features employed by the meal content determination module of FIG. 1, according to a preferred embodiment of the present invention.

FIG. 4B is a process flow diagram illustrating exemplary steps for classifying and segmenting food items using color and texture features employed by the meal content determination module 16 of FIG. 1. According to the preferred embodiment of the present invention of FIG. 4B, offline and online feature extraction steps 54 and 64, respectively, offline K-means clustering step 56, offline classification step 58, and on-line classification step 66 of FIG. 4A may be replaced by offline feature extraction step 54' (a corresponding online feature extraction step is not needed), offline classification step 58' and online classification step 66' of FIG. 4B. The task of food recognition is formulated in steps as a multi-class classification problem. In offline feature extraction step 54', features are extracted using Texton histograms. In offline classification step 58', multi-class recognition problem may be simplified by making use of the user providing a candidate food type set 65 acquired during speech recognition as described above. In order to make full use of this additional cue, a set of one-versus-one classifiers are trained between each pair of foods. A segmentation map is generated by applying a multi-class classifier densely (i.e., every patch) to an input image. An Adaboost-based feature selection classifier is adapted to combine color and texture information to achieve an acceptable food type recognition rate over a large number of food types. In online classification step 66' based on these offline trained pair-wise classifiers, a dynamically assembled trained classifier is created according to the candidate set on the fly to assign a small set of labels to each pixel.

Figure 5:
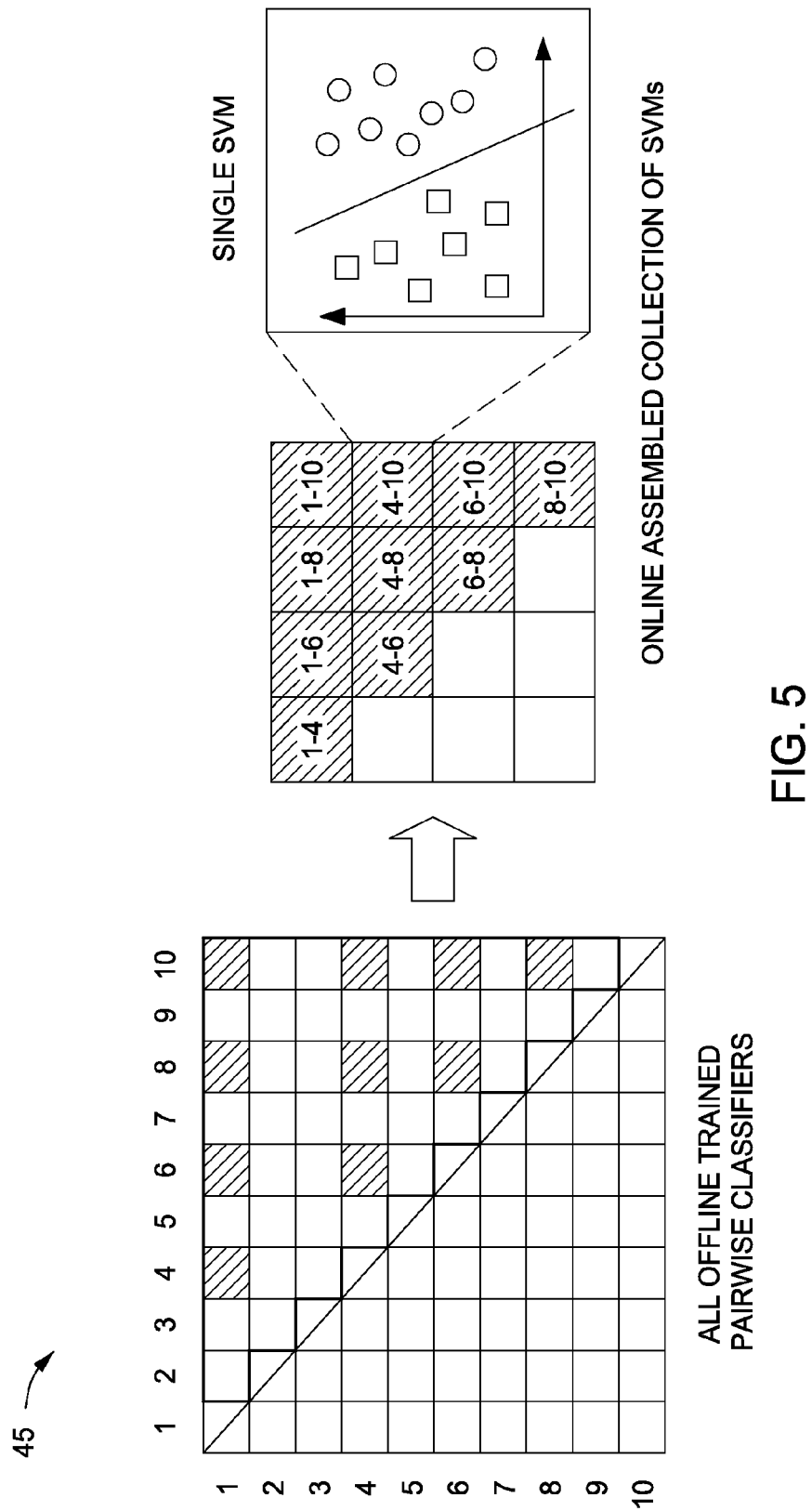
FIG. 5 shows an illustration of the pair-wise classification framework with a set of 10 classes, according to an embodiment of the present invention.

Suppose there exist N classes of food $\{f_i: i=1, \ldots, N\}$, then all the pair-wise classifiers may be represented as $C=\{C_{ij}: i,j\in[1,N], i<j\}$. The total number of classifiers, $|C|$, is $N\times(N-1)/2$. For a set of K candidates, $K\times(K-1)/2$ pair-wise classifiers are selected to assemble a K-class classifier. The dominant label assigned by the selected pair-wise classifiers is the output of the K-class classification. If there is no unanimity among the K pair-wise classifiers corresponding to a food type, then the final output is set to unknown. FIG. 5 shows an illustration of the pair-wise classification framework with a set of 10 classes. The upper triangular matrix contains 45 offline trained classifiers. If 5 classes (1, 4, 6, 8 and 10) are chosen as candidates by the user, then 10 pair-wise classifiers may be assembled to form a 5-class classifier. If 4 out of 10 classifiers report the same label, this label is reported as the final label, otherwise an unknown label is reported by the 5-class classifier.

The advantages of this framework are two-fold. First, computation cost is reduced during the testing phase. Second, compared with one-versus-all classifiers, this framework avoids N imbalance in training samples (a few positive samples versus a large number of negative samples). Another strength of this framework is its extendibility. Since there are a large number of food types, users of the system 30 of FIG. 2 may incrementally update existing classes with new instances and add new food types without re-training classifiers from scratch. This pair-wise framework is easy to adapt to new classes and to new instances. If there exists N pre-trained classes, then updating a class may be accomplished by re-training (N−1) classifiers in the upper triangular matrix; adding a new class, named $f_{N+1}$, is equivalent to adding a new column (N) of classifiers $\{C_{i,N+1}: i=1, \ldots, N\}$.

To compute a label map (i.e., labels for items on a food plate), classifiers are applied densely (every patch) on the color and scale normalized images. To train such a classifier, the training set is manually annotated to obtain segmentation, in the form of label masks, of the food. Texton histograms are used as features for classification, which essentially translate to a bag-of-words. There are many approaches that have been proposed to create textons, such as spatial-frequency based textons as described in M. Varma and A. Zisserman, "Classify images of materials: Achieving viewpoint and illumination independence," in *ECCV*, pages 255-271, 2002 (hereinafter "Varma1"), MRF textons as described in M. Varma and A. Zisserman, "Texture classification: Are filter banks necessary?" In *CVPR*, pages 691-698, 2003 (hereinafter "Varma2"), and gradient orientation based textons as described in D. Lowe, "Distinctive image features from scale-invariant keypoints," *IJCV*, pages 91-110, 2004. A detailed survey and comparison of local image descriptors may be found in K. Mikolajczyk and C. Schmid, "A performance evaluation of local descriptors," *PAMI*, pages 1615-1630, 2005.

It is important to choose the right texton as it directly determines the discriminative power of texton histograms. The current features used in the system 30 include color (RGB and LAB) neighborhood features as described in Varma1 and Maximum Response (MR) features as described in Varma2. The color neighborhood feature is a vector that concatenates color pixels within an L×L patch. Note that for the case L=1 this feature is close to a color histogram. An MR feature is computed using a set of edge, bar, and block filters along 6 orientations and 3 scales. Each feature comprises eight dimensions by taking a maximum along each orientation as described in Varma2. Note that when the convolution window is large, convolution is directly applied to the image instead of patches. Filter responses are computed and then a feature vector is formed according to a sampled patch. Both color neighborhood and MR features may be computed densely in an image since the computational cost is relatively low. Moreover, these two types of features contain complementary information: the former contains color information but cannot carry edge information at a large scale, which is represented in the latter MR features; the latter MR features do not encode color information, which is useful to separate foods. It has been observed that by using only one type of feature at one scale a satisfactory result cannot be achieved over all pair-wise classifiers. As a result, feature selection may be used to create a strong classifier from a set of weak classifiers.

A pair of foods may be more separable using some features at a particular scale than using other features at other scales. In training a pair-wise classifier, all possible types and scales of features may be choose and concatenated into one feature vector. This, however, puts too much burden on the classifier by confusing it with non-discriminative features. Moreover, this is not computationally efficient. Instead, a rich set of local feature options (color, texture, scale) may be created and a process of feature selection may be employed to automatically determine the best combination of heterogeneous features. The types and scales of features used in current system are shown in Table 1.

TABLE 1

Features options

| Type | Scale |
|---|---|
| Color (RGB/LAB) Neighborhood (See Varma1) | 1, 3, 5, 7 |
| Maximum Responses (See Varma2) | 0.5, 1, 2 |

The feature selection algorithm is based on Adaboost as described in R. E. Schapire, Y. Freund, P. Bartlett, and W. S. Lee, "Boosting the margin: A new explanation for the effectiveness of voting methods," *The Annals of Statistics*, pages 1651-1686, 1998, which is an iterative approach for building strong classifiers out of a collection of "weak" classifiers. Each weak classifier corresponds to one type of texton histogram. An $\chi^2$ kernel SVM is adopted to train the weak classifier using one feature in the feature pool. A comparison of different kernels in J. Zhang, M. Marszalek, S. Lazebnik, and C. Schmid, "Local features and kernels for classification of texture and object categories: A comprehensive study," *IJCV*, pages 213-238, 2007, shows that $\chi^2$ kernels outperform the rest.

A feature set $\{f_1, \ldots, f_n\}$ is denoted by F. In such circumstances, a strong classifier based on a subset of features by $\overline{F} \subset F$ may be obtained by linear combination of selected weak SVM classifiers, h: X→R, $$h_F(x) = \text{sign}\left(\sum_{f_i \in F} \alpha_{f_i} h_{f_i}(x)\right) \quad (1)$$

where $$\alpha_{f_i} = \frac{1}{2}\ln\left(\frac{1-\varepsilon_{f_i}}{\varepsilon_{f_i}}\right)$$

and $\varepsilon_{f_i}$ is the weighed error rate of the weak classifier $f_i$. For a sample x, denote its true class label by y(=±1). The classification margin of h on x is defined by y×h(x). The classification margin represents the discriminative power of the classifier. Larger margins imply better generalization power. Adaboost is an approach to iteratively select the feature in the feature pool which has the largest margin according to current distribution (weights) of samples.

$$h_{k+1} = \underset{h \in F}{\text{argmax}} M(H_k + h) \quad (2)$$

where $H_k$ is the strong classifier learned in the $k^{th}$ round and M(•) is the expected margin on X.

As each h is a SVM, this margin may be evaluated by N-fold validation (in our case, we use N=2). Instead of comparing the absolute margin of each SVM, a normalized margin is adopted, as $$M(h, x) = \frac{yh(x)}{PhP},$$

where PhP denotes the number of support vectors. This criterion actually measures the discriminative power per support vector. This criterion avoids choosing a large-margin weak classifier that is built with many support vectors and possibly overfits the training data. Also, this criterion tends to produce a smaller number of support vectors to ensure low complexity.

Figure 6:
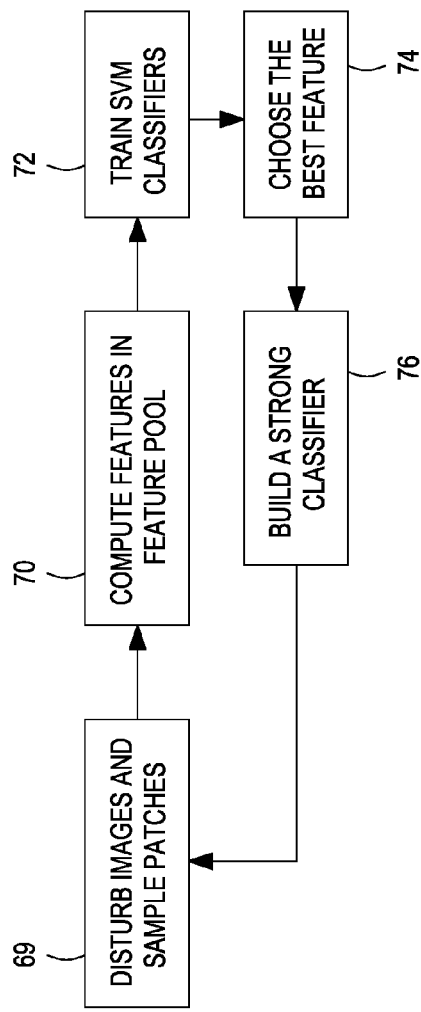
FIG. 6 is a block diagram of a bootstrap procedure for sampling training data and select features simultaneously for use in the method of FIG. 4, according to an embodiment of the present invention.

Another issue in the present invention is how to make full use of training data. Given annotated training images and a patch scale, a large number of patches may be extracted by rotating and shifting the sampling windows. Instead of using a fixed number of training samples or using all possible training patches, a bootstrap procedure is employed as shown in FIG. 6 to sample training data and select features simultaneously. Initially, at step 70, a set of training data is randomly sampled and all features in feature pool are computed. At step 72, individual SVM classifiers are trained. At step 74, a 2-fold validation process is employed to evaluate the expected normalized margin for each feature and the best one is chosen to update the strong classifier with weighted classification error in step 76. The current strong classifier is applied to densely sampled patches in the annotated images, wrongly classified patches (plus the ones close to the decision boundary) are added as new samples, and weights of all training samples are updated. Note that in step 69 training images in the LAB color space are perturbed before bootstrapping. The training is stopped if the number of wrongly classified patches in the training images falls below a predetermined threshold.

Figure 7:
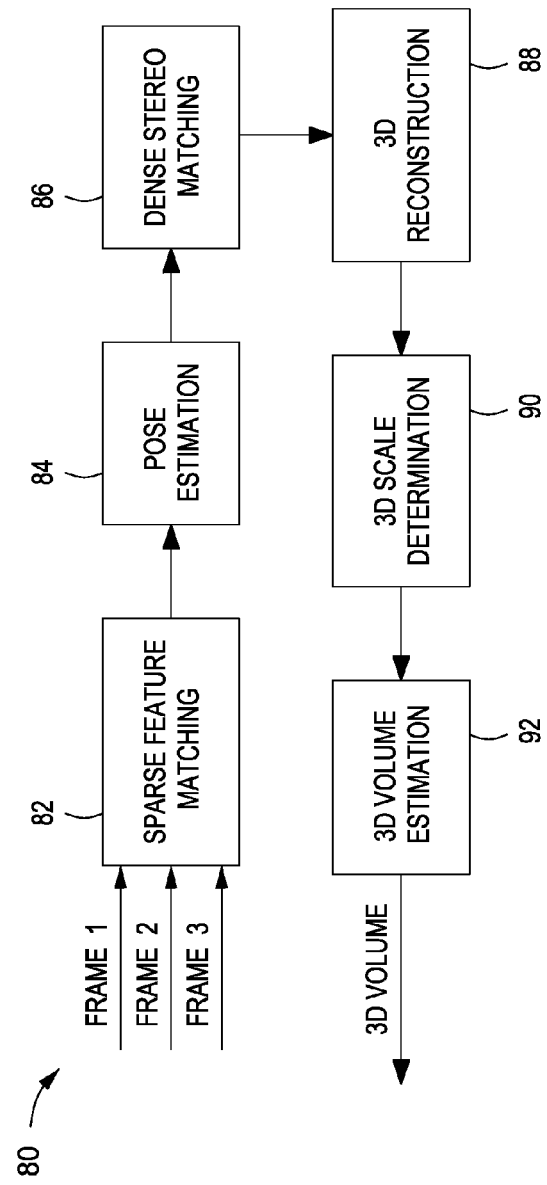
FIG. 7 is a process flow diagram illustrating exemplary steps for estimating food volume of a food plate in 3D that has been classified and segmented, according to an embodiment of the present invention.

FIG. 7 is a process flow diagram illustrating exemplary steps for estimating food volume of a food plate in 3D that has been classified and segmented. In order to estimate the volume of food items on a user's plate, at step 80, a set of three 2D images is taken at different positions above the plate with a calibrated image capturing device (e.g., a cell phone camera) using an object of known size for 3D scale determination. At step 82, multiple feature points in each image frame are extracted and matches between the three 2D images. At step 84, using the matched feature points, the relative camera poses among the three 2D images are estimated. In a dense stereo matching step 86, two images from the three 2D images are selected to form a stereo pair and from dense sets of points, correspondences between the two views of a scene of the two images are found. In step 88, a 3D reconstruction is carried out on the correspondences to generate 3D point clouds of the food. Finally, from the reconstructed 3D point cloud, both the 3D scale (step 92) and table plane are estimated to compute the 3D volume of each food item (step 94).

According to an embodiment of the present invention, and referring again to step 82, the multiple feature points in each of the three 2D images are extracted matches between images using Harris corners, as described in C. Harris and M. Stephens, "A combined corner and edge detector," in the *4th Alvey Vision Conference*, 1988. However, any other feature which describes an image point in a distinctive manner may be used. Each feature correspondence establishes a feature track, which lasts as long as it is matched across the images. These feature tracks are later sent into the pose estimation step 84 which is carried out using a preemptive RANSAC-based method as described in D. Nister, O. Naroditsky, and J. Bergen, "Visual odometry," in CVPR, 2004, as explained in more detail hereinbelow.

The preemptive RANSAC algorithm randomly selects different sets of 5-point correspondences over three frames such that N number of pose hypotheses (by default N=500) are generated using a 5-point algorithm. Here, each pose hypothesis comprises the pose of the second and third view with respect to the first view. Then, starting with all of the hypotheses, each one is evaluated on chunks of M data points based on trifocal Sampson error (by default M=100), every time dropping out half of the least scoring hypotheses. Thus, initially, 500 pose hypotheses are proposed, all of which are evaluated on a subset of 100-point correspondences. Then the 500 pose hypotheses are sorted according to their scores on the subset of 100-point correspondences and the bottom half is removed. In the next step, another set of 100 data points is selected on which the remaining 250 hypotheses are evaluated and the least scoring half are pruned. This process continues until a single best-scoring pose hypothesis remains.

In the next step, the best pose at the end of the preemptive RANSAC routine is passed to a pose refinement step where iterative minimization of a robust cost function (derived from Cauchy distribution) of the re-projection errors is performed through Levenberg-Marquardt method as described in R. Hartley and A. Zisserman, "*Multiple View Geometry in Compiler Vision*," Cambridge University Press, 2000, pp. 120-122.

Using the above proposed algorithm, camera poses are estimated over three views such that poses for the second and third view are with respect to the camera coordinate frame in the first view. In order to stitch these poses, the poses are placed in the coordinate system of the first camera position corresponding to the first frame in the image sequence. At this point, the scale factor for the new pose-set (poses corresponding to the second and third views in the current triple) is also estimated with another RANSAC scheme.

Figure 8A:
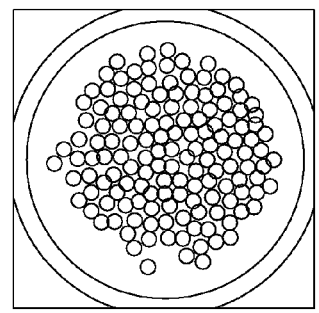
FIG. 8A shows a cropped left image of the food plate used in a dense stereo matching step of FIG. 7.
Figure 8B:
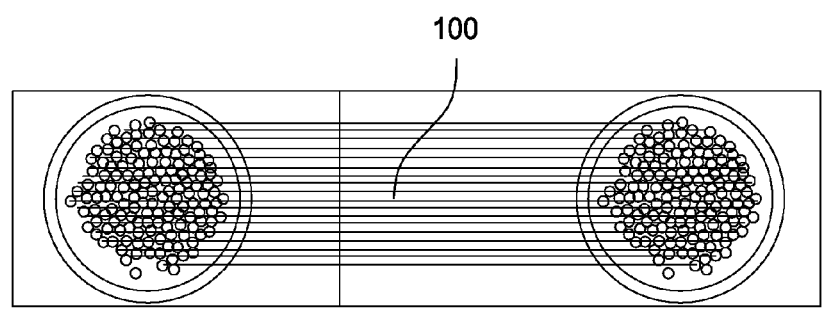
FIG. 8B shows the corresponding matches between left and right frames of the food plate of FIG. 8A by a set of horizontal lines using the dense stereo matching step of FIG. 7.

Once the relative camera poses between the image frames have been estimated, in a dense stereo matching step 86, two images from the three 2D images are selected to form a stereo pair and from dense sets of points, correspondences between the two views of a scene of the two images are determined. For each pixel in the left image, its corresponding pixel in the right image is searched using a hierarchal pyramid matching scheme. Once the left-right correspondence is found, in step 88, using the intrinsic parameters of the pre-calibrated camera, the left-right correspondence match is projected in 3D using triangulation. At this stage, any bad matches are filtered out by validating them against the epipolar constraint. To gain speed, the reconstruction process is carried out for all non-zero pixels in the segmentation map provided by the food classification stage. FIG. 8 shows the corresponding matches between left and right frames by a set of horizontal lines 100.

Referring again to FIG. 7, after the pose estimation step 84, there is still a scale ambiguity in the final pose of the three 2D frames. In order to recover a global scale factor, an object with known dimensions is placed and captured along with the plate of food in the image. For simplicity, according to an embodiment of the present invention, a checker-board may be employed. In order to compute 3D scale, each corner of the checker-board in an image is detected followed by its reconstruction to obtain corresponding 3D coordinates. The size of each checker-board square is determined in 3D from its respective corners. Let $d_{Ref}$ be the real size of checker-board as measured by ground truth and $d_{Est}$ be its size as obtained by estimation in 3D. Then, the 3D scale (S) is computed using equation 3. In the present embodiment, a 3×3 checker-board may be used, with $d_{Ref}$=3.14 cms.

$$S = d_{Ref}/d_{Est} \tag{3}$$

Figure 9A:
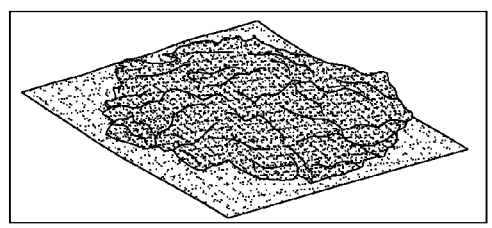
FIG. 9A displays a top perspective view of a 3D point cloud for an image of the food plate of FIG. 8A obtained after performing the stereo reconstruction step of FIG. 7.
Figure 9B:
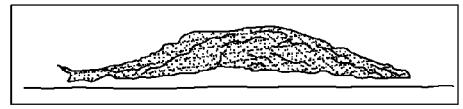
FIG. 9B displays a side view of a 3D point cloud for an image of the food plate of FIG. 8A obtained after performing the stereo reconstruction step of FIG. 7.

Once the 3D scale is computed using the checker-board, an overall scale correction is made to all the camera poses over the set of frames and the frames are mapped to a common coordinate system. Following stereo reconstruction, a dense 3D point cloud for all points on the plate is obtained. FIG. 9 displays an example of a 3D point cloud for an image of a food plate. Since the volume of each food item needs to be measured with respect to a reference surface, estimation of the table plane is carried out as a pre-requisite step. By inspection of the image, a person skilled in the art would appreciate that, apart from pixels corresponding to food on the plate, most pixels lie on the table plane. Hence, table estimation is performed by employing RANSAC to fit a 3D plane equation on feature points earlier used for camera pose estimation. To obtain better accuracy, points falling on the plate are removed for the purpose of plane fitting by using the boundaries obtained from the plate detection step. Once the table plane has been estimated, it is used to slice the entire point cloud into two portions such that only 3D points above the plane are considered for the purpose of volume estimation.

Referring again to FIG. 7, the volume estimation step 94 is carried out in two sub-steps. First, Delaunay triangulation is performed to fit the surface of food. Second, total volume of the food ($V_{Total}$) is calculated as a sum of individual volumes ($V_i$) for each Delaunay triangles obtained from the previous step. Equation 4 shows computation of total food volume where K is the total number of triangles.

$$V_{Total} = \sum_{i=1}^{K} V_i \quad (4)$$

One of the main tasks of the present invention is to report volumes of each individual food item on a user's plate. This is done by using the binary label map obtained after food recognition. The label map for each food item consists of non-zero pixels that have been identified as belonging to the food item of interest and zero otherwise. Using this map, a subset of the 3D point cloud is selected that corresponds to reconstruction of a particular food label that is then feed it into the volume estimation process. This step is repeated for all food items on the plate to compute their respective volumes.

Experiments were carried out to test the accuracy of certain embodiments of the present invention. In order to standardize analysis of various foods, the USDA Food and Nutrient Database for Dietary Studies (FNDDS) was consulted, which contains more than 7,000 foods along with the information such as, typical portion size and nutrient value. 400 sets of images containing 150 commonly occurring food types in the FNDDS were collected. This data was used to train classifiers. An independently collected data set with 26 types of foods was used to evaluate the recognition accuracy. N (in this case, N=500) patches were randomly sampled from images of each type of food and the accuracy of classifiers trained in different ways was evaluated as follows:

Using a single MR feature ($\sigma_{x_1}=0.5$);
Using single RGB neighborhood features (at 3×3 scale);
Using combined features with fixed number of training samples per food label;
Using feature selection in the proposed bootstrap framework.

Figure 10:
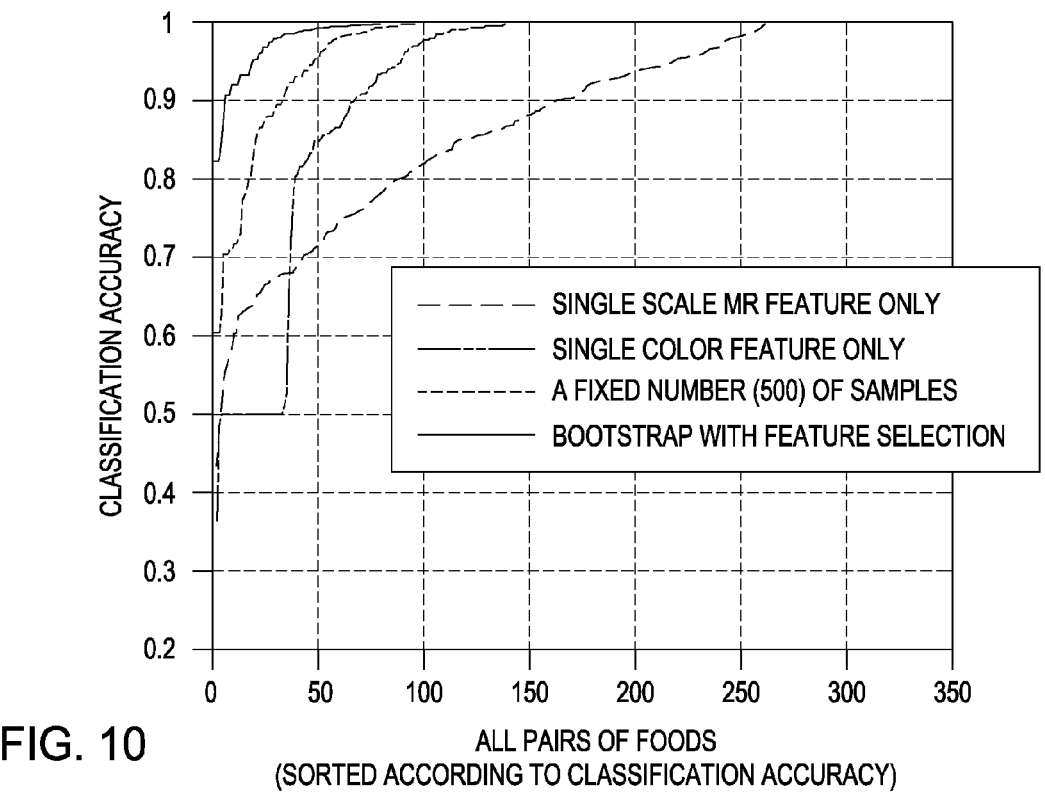
FIG. 10 shows a comparison of sorted pair-wise classification accuracy obtained during testing of the system of FIG. 2.

For comparison, all pair-wise classifiers were trained (13× 25=325) and classification accuracy was sorted. As each pair-wise classifier $c_{i,j}$ was evaluated over 2N patches (N patches in label i and N patches in label j), the pair-wise classification accuracy is the ratio of correct instances over 2N. FIG. 10 shows the comparison of sorted pair-wise classification accuracy. By applying the feature selection in the bootstrap procedure, a significant improvement was achieved over using a single feature and using a fixed number of training samples.

Figure 11:
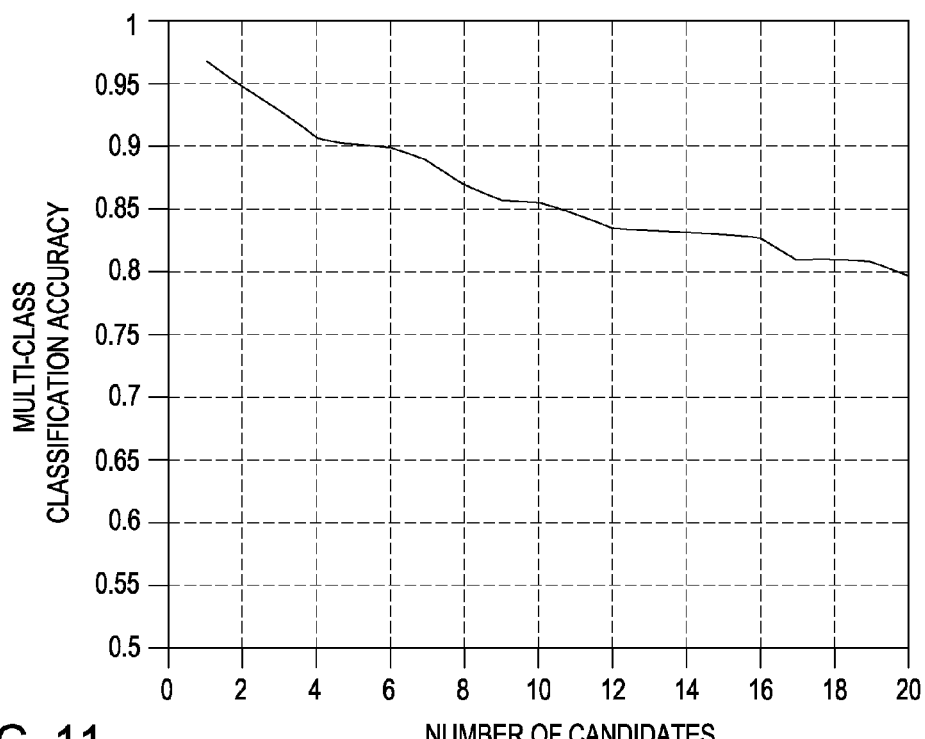
FIG. 11 is a graph that plots the accuracy of the multi-class classifier obtained during testing of the system of FIG. 2.

In order to evaluate the multi-class classifiers assembled online based on user input, K confusing labels were randomly added to each ground truth label in the test set. Hence, the multi-class classifier had K+1 candidates. The accuracy of the multi-class classifier is shown in FIG. 11. As can be seen in FIG. 11, accuracy drops as the number of candidates increases. The larger the number of candidates, the more likely the confusion between them. However, the number of foods in a meal is rarely greater than 6, for which about a 90% accuracy was achieved.

Qualitative results of classification and 3D volume estimation are shown in FIG. 12 (Table 2): the first column shows the images after scale and color normalization; the second column shows the classification results and the last column shows the reconstructed 3D surface obtained using Delaunay triangulation and the estimated table plane, which are used for computing the volume. Table 3 shows the quantitative evaluation of these sets. In the system of the present invention, volume is returned in milliliter units. This value may be converted to calories by indexing into the FNDDS.

TABLE 3

Quantitative classification and 3D volume results

| Set # | Food | Ground truth (in ml) | Estimate (in ml) | Error (%) |
|---|---|---|---|---|
| 1 | Broccoli | 150 | 143.5 | 4.3 |
|   | Carrots | 120 | 112.3 | 6.4 |
| 2 | Orange | 195 | 189.4 | 2.9 |
|   | Bagel | 300 | 310.5 | 3.5 |
| 3 | Fries | 200 | 194.8 | 2.6 |
|   | Steak | 190 | 203.9 | 7.3 |
|   | Broccoli | 180 | 186.3 | 3.5 |
| 4 | Spinach | 160 | 151.2 | 5.5 |
|   | Cucumber | 100 | 98.2 | 1.5 |
|   | Olives | 100 | 104.8 | 4.8 |
|   | Broccoli | 120 | 114.2 | 4.8 |
|   | Peppers | 80 | 82.7 | 3.4 |
| 5 | Olives | 100 | 98.4 | 1.6 |
|   | Carrots | 90 | 82.7 | 8.1 |
|   | Peas | 120 | 123.8 | 3.2 |
|   | Chickpeas | 100 | 103.1 | 3.1 |
|   | Cucumber | 140 | 144.2 | 3.0 |
|   | Peppers | 90 | 84.1 | 6.6 |
| 6 | Chicken | 130 | 121.2 | 6.8 |
|   | Fries | 150 | 133.6 | 10.9 |

Figure 13:
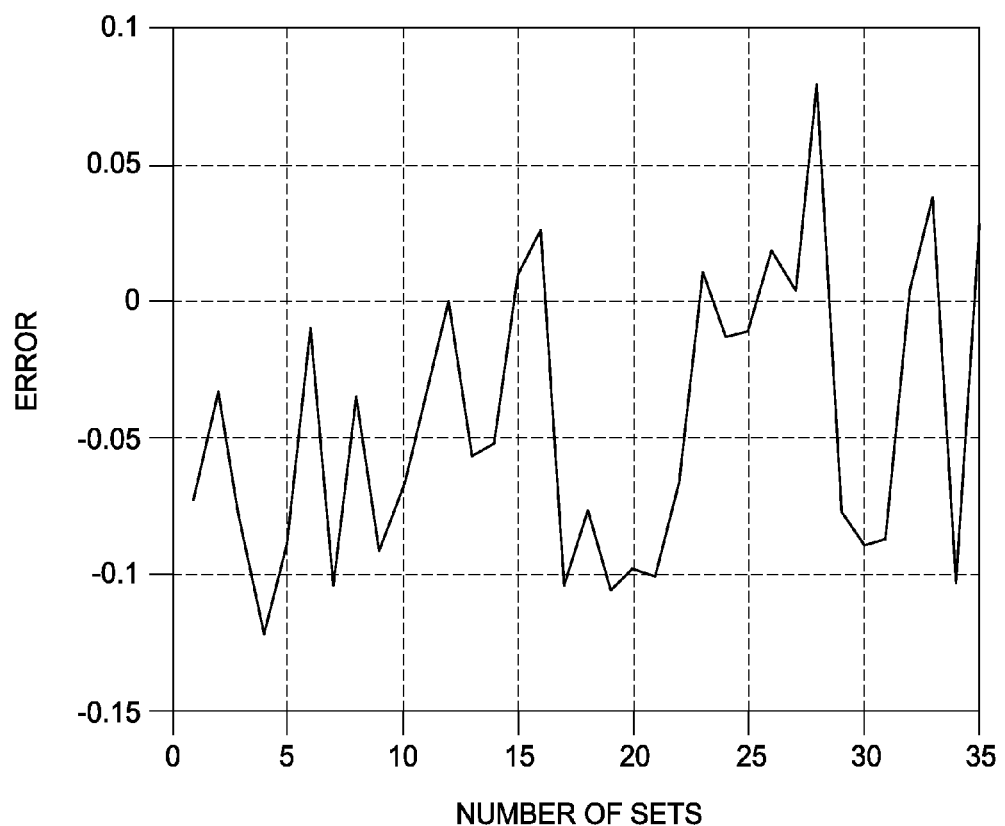
FIG. 13 shows a plot of error rate per image set for testing the accuracy and repeatability of volume estimation under different capturing conditions obtained during testing of the system of FIG. 2.

To test the accuracy and repeatability of volume estimation under different capturing conditions, an object with a known ground truth volume is given as input to the system. For this evaluation, 35 image sets of the object were captured taken at different viewpoints and heights. FIG. 13 shows a plot of error rate per image set. The average error in volume is 5.75 (±3.75)% over all the sets.

The experimental system was run on a Intel Xeon workstation with 3 GHz CPU and 4 GB of RAM. The total turn-around time was 52 seconds (19 seconds for classification and 33 seconds for dense stereo reconstruction and volume estimation on a 1600×1200 pixel image). The experimental system was not optimized and ran on a single core.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. A computer-implemented method for analyzing at least one food item on a food plate, the method being executed by at least one processor, comprising the steps of:
   receiving a plurality of images of the food plate;
   receiving a description of the at least one food item on the food plate;
   extracting a list of food items from the description;
   classifying and segmenting the at least one food item from the list using color and texture features derived from the plurality of images by:
   applying an offline feature-based learning method of different food types to train a plurality of classifiers to recognize individual food items; and
   applying an online feature-based segmentation and classification method using at least a subset of the food type recognition classifiers trained during offline feature-based learning; and
   estimating the volume of the classified and segmented at least one food item based on determining correspondences between at least two images of the plurality of images containing the at least one food item and performing a 3D reconstruction on the correspondences to generate 3D point clouds of the at least one food item.

2. The method of claim 1, further comprising the step of estimating the caloric content of the at least one food item.

3. The method of claim 1, wherein the description is at least one of a voice description and a text description.

4. The method of claim 1, wherein the step of applying an offline feature-based learning method further comprises the steps of:
   selecting at least three images of the plurality of images wherein the at least three images capture the same scene;
   color normalizing at least one of the three images;
   employing an annotation tool to identify each food type; and
   processing the color normalized image to extract color and texture features.

5. The method of claim 4, wherein the step of color normalizing comprises detecting a color pattern in the scene.

6. The method of claim 1, wherein the step of applying an online feature-based segmentation and classification method further comprises the steps of:
   selecting at least three images of the plurality of images, the at least three images capturing the same scene;
   color normalizing at least one of the three images;
   locating the food plate using a contour based circle detection method; and
   processing the color normalized image to extract color and texture features.

7. The method of claim 6, wherein the step of color normalizing comprises detecting a color pattern in the scene.

8. The method of claim 4, wherein the step of processing the color normalized image to extract color and texture features further comprises the steps of:
   transforming color features to a CIE L*A*B color space;
   determining 2D texture features by applying a histogram of orientation gradient (HOG) method; and
   placing the color features and 2D texture features into bins of histograms in a higher dimensional space.

9. The method of claim 6, further comprising the steps of:
   representing at least one food type by a cluster of color and texture features in a high-dimensional space using an incremental K-means clustering method;
   representing at least one food type by Texton histograms; and
   classifying the one food type using an ensemble of boosted SVM classifiers.

10. The method of claim 6, wherein the step of applying an online feature-based segmentation and classification method further comprises the steps of:
    applying a k-nearest neighbors (k-NN) classification method to the extracted color and texture features to each pixel of the color normalized image and assigning at least one label to each pixel;
    applying a dynamic assembled multi-class classifier to an extracted color and texture feature for each patch of the color normalized image and assigning one label to each patch; and
    applying an image segmentation technique to obtain a final segmentation of the plate into its constituent food labels.

11. The method of claim 4, wherein the step of processing the color normalized image to extract color and texture features further comprises the steps of:
    extracting color and texture features using Texton histograms;
    training a set of one-versus-one classifiers between each pair of foods; and
    combining color and texture information from the Texton histograms using an Adaboost-based feature selection classifier.

12. The method of claim 6, wherein the step of applying an online feature-based segmentation and classification method further comprises the steps of:
    applying a multi-class classifier to every patch of the three input images to generate a segmentation map; and
    dynamically assembling a multi-class classifier from a subset of the offline trained pair-wise classifiers to assign a small set of labels to each pixel of the three images.

13. The method of claim 12, wherein features are selected for applying a multi-class classifier to every patch of the three input images by employing a bootstrap procedure to sample training data and select features simultaneously.

14. The method of claim 13, wherein the bootstrap procedure comprises the steps of:
    randomly sampling a set of training data and computing all features in feature pool;
    training individual SVM classifiers;
    applying a 2-fold validation process to evaluate the expected normalized margin for each feature to update the strong classifier;
    applying a current strong classifier to densely sampled patches in the annotated images, wherein wrongly classified patches are added as new samples, and weights of all training samples are updated; and
    stopping the training if the number of wrongly classified patches in the training images falls below a predetermined threshold.

15. The method of claim 1, wherein the step of estimating volume of the classified and segmented at least one food item further comprises the steps of:
    capturing a set of at least three 2D images from the plurality of images taken at different positions above the food plate with a calibrated image capturing device using an object of known size for 3D scale determination;
    extracting and matching multiple feature points in each image frame;
    estimating camera poses among the at least three images using the matched feature points;
    selecting at least two images from the at least three images;
    determining correspondences between the at least two images selected from at least the at least three images;

performing a 3D reconstruction on the correspondences and determining a 3D scale based on the object of known size to generate 3D point cloud;

estimating at least one surface of the at least one food item above the food plate based on at least the reconstructed 3D point cloud; and estimating the volume of the at least one food item based on the at least one surface.

16. The method of claim 1, further including the step of profiling at least one of the user and meal to include at least one food item not input during said step of receiving a description of the at least one food item on the food plate.

17. A system for analyzing at least one food item on a food plate, comprising:

an image capturing device for receiving a plurality of images of the food plate;

a description recognition device for receiving a description of the at least one food item on the food plate; and a processor for:

classifying and segmenting the at least one food item using one or more features of the at least one food item derived from the plurality of images, by applying an online feature-based segmentation and classification method using one or more food type recognition classifiers trained during offline feature-based learning; and estimating the volume of the classified and segmented at least one food item based on determining correspondences between at least two images of the plurality of images containing the at least one food item.

18. The system of claim 17, wherein the description device is at least one of a voice recognition device and a text recognition device.

19. The system of claim 18, wherein the voice recognition device is equipped with automatic speech recognition software.

20. The system of claim 19, wherein the image capturing device and the voice recognition device are integrated in a single device.

21. The system of claim 17, wherein the image capturing device is one of a cell phone or smart phone equipped with a camera, a laptop or desktop computer or workstation equipped with a webcam, or a camera operating in conjunction with a computing platform.

22. The system of claim 17, wherein the processor is integrated into a voice processing server/computer one of directly connected to the image capturing device and remotely over a cell network and/or the Internet.

23. The system of claim 17, wherein the processor estimates the caloric content of the at least one food item.

24. A non-transitory computer-readable medium storing computer code for analyzing at least one food item on a food plate, the code being executed by at least one processor, wherein the computer code comprises code for:

receiving a plurality of images of the food plate;

receiving a description of the at least one food item on the food plate;

extracting a list of food items from the description;

classifying and segmenting the at least one food item from the list using color and texture features derived from the plurality of images by:

applying an offline feature-based learning method of different food types to train a plurality of classifiers to recognize individual food items; and applying an online feature-based segmentation and classification method using at least a subset of the food type recognition classifiers trained during offline feature-based learning; and estimating the volume of the classified and segmented at least one food based on determining correspondences between at least two images of the plurality of images containing the at least one food item and performing a 3D reconstruction on the correspondences to generate 3D point clouds of the at least one food item.

25. The computer-readable medium of claim 24, further comprising code for estimating the caloric content of the at least one food item.

26. The computer-readable medium of claim 24, wherein the description is at least one of a voice description and a text description.

27. The computer readable medium of claim 24, wherein code for applying an offline feature-based learning method further comprises code for:

selecting at least three images of the plurality of images, the at least three images capturing the same scene;

color normalizing one of the three images;

employing an annotation tool to identify each food type; and processing the color normalized image to extract color and texture features.

28. The computer readable medium of claim 24, wherein code for applying an online feature-based segmentation and classification method further comprises code for:

selecting at least three images of the plurality of images, wherein the at least three images capture the same scene;

color normalizing one of the three images;

locating the food plate using a contour based circle detection method; and processing the color normalized image to extract color and texture features.

29. The computer readable medium of claim 28, wherein code for processing the color normalized image to extract color and texture features further comprises:

extracting color and texture features using Texton histograms;

training a set of one-versus-one classifiers between each pair of foods; and combining color and texture information from the Texton histograms using an Adaboost-based feature selection classifier.

30. The computer readable medium of claim 24, wherein code for applying an online feature-based segmentation and classification method further comprises code for:

applying a multi-class classifier to every patch of the three input images to generate a segmentation map; and dynamically assembling a multi-class classifier from a subset of the offline trained pair wise classifiers to assign a small set of labels to each pixel of the three input images.

31. The computer readable medium of claim 24, wherein code for estimating volume of the classified and segmented at least one food item further comprises code for:

capturing a set of at least three 2D images from the plurality of images taken at different positions above the food plate with a calibrated image capturing device using an object of known size for 3D scale determination;

extracting and matching multiple feature points in each image frame;

estimating relative camera poses among the at least three m images using the matched feature points;
selecting at least two images from the at least three images;
determining correspondences between the at least two images selected from at least the at least three images;
performing a 3D reconstruction on the correspondences and determining a 3D scale based on the object of known size to generate 3D point cloud;
estimating at least one surface of the at least one food item above the food plate based on at least the reconstructed 3D point cloud; and
estimating the volume of the at least one food item based on the at least one surface.

32. The system of claim 17, wherein the estimating volume of the classified and segmented at least one food item further comprises:
capturing a set of at least three images from the plurality of images taken at different positions above the food plate with a calibrated image capturing device using an object of known size for 3D scale determination;
extracting and matching multiple feature points in each image frame;
estimating camera poses among the at least three images using the matched feature points;
selecting at least two images from the at least three images;
determining correspondences between at least two image selected from at least the at least three 2D images;
performing a 3D reconstruction on the correspondences and determining a 3D scale based on the object of known size to generate a 3D point cloud; and
estimating at least one surface of the at least one food item above the food plate based on at least the reconstructed 3D point cloud; and
estimating the volume of the at least one food item based on the at least one surface.

* * * * *